United States Patent
Matsumoto et al.

(10) Patent No.: US 11,871,275 B2
(45) Date of Patent: Jan. 9, 2024

(54) NODE APPARATUS, METHOD FOR CONTROLLING THE SAME, AND STORAGE MEDIUM

(71) Applicant: KDDI CORPORATION, Tokyo (JP)

(72) Inventors: Nobutaka Matsumoto, Fujimino (JP); Koutarou Ichikawa, Fujimino (JP); Akinari Nanba, Fujimino (JP); Takeshi Kitahara, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 516 days.

(21) Appl. No.: 17/008,867

(22) Filed: Sep. 1, 2020

(65) Prior Publication Data

US 2020/0396644 A1    Dec. 17, 2020

Related U.S. Application Data

(63) Continuation of application No. PCT/JP2018/041137, filed on Nov. 6, 2018.

(30) Foreign Application Priority Data

Mar. 30, 2018  (JP) ................. 2018-067543

(51) Int. Cl.
*H04W 28/10* (2009.01)
*H04L 47/70* (2022.01)
(Continued)

(52) U.S. Cl.
CPC .......... *H04W 28/10* (2013.01); *H04L 47/824* (2013.01); *H04W 28/0231* (2013.01); *H04W 48/14* (2013.01)

(58) Field of Classification Search
None
See application file for complete search history.

(56) References Cited

U.S. PATENT DOCUMENTS 11,039,384 B2    6/2021    Ushida et al.
2014/0213241 A1  7/2014    Altintas
(Continued)

FOREIGN PATENT DOCUMENTS

JP    2007-074210 A    3/2007
JP    2010-191603 A    9/2010
(Continued)

OTHER PUBLICATIONS

Huang et al. "V2V Data Offloading for Cellular Network Based on the Software Defined Network (SDN) Inside Mobile Edge Computing (MEC) Architecture", IEEE Access, vol. 6, 2018, pp. 17741-17755 (Year: 2018).*

(Continued)

*Primary Examiner* — Mariela Vidal Carpio
(74) *Attorney, Agent, or Firm* — Foley & Lardner LLP

(57) ABSTRACT

An MEC node acquires, from each base station, a measured traffic volume in a cell (target cell) formed by each base station, and predicts a traffic volume after a unit time in the target cell based on the measured traffic volume. Upon receiving from a vehicle in the target cell an inquiry regarding whether or not data transmission is permitted, the MEC node determines whether or not to permit data transmission by the vehicle, based on a prediction result of the traffic volume, and a volume of data to be transmitted by the vehicle which is indicated by information included in the inquiry. In accordance with a result of the determination, the MEC node transmits, to the vehicle that has transmitted the inquiry, a response indicating whether or not to permit data transmission.

15 Claims, 6 Drawing Sheets

(51) Int. Cl.
*H04W 28/02* (2009.01)
*H04W 48/14* (2009.01)

(56) References Cited

U.S. PATENT DOCUMENTS

| | | | | |
|---|---|---|---|---|
| 2019/0088147 A1* | 3/2019 | Kusuma | ............... | G08G 5/0013 |
| 2019/0150080 A1* | 5/2019 | Davies | ............... | H04B 7/18513 370/329 |
| 2019/0339082 A1* | 11/2019 | Doig | .................... | G08G 1/0141 |
| 2020/0267518 A1* | 8/2020 | Sabella | ................ | H04W 12/06 |
| 2020/0280827 A1* | 9/2020 | Fechtel | ................... | H04W 4/80 |
| 2020/0296187 A1* | 9/2020 | Sabella | ................... | H04L 67/12 |
| 2020/0314600 A1* | 10/2020 | Kolde | ................... | H04L 12/184 |
| 2020/0336965 A1* | 10/2020 | Niwa | ................ | H04W 36/0061 |
| 2021/0074166 A1* | 3/2021 | Chang | ................ | H04B 7/18506 |
| 2021/0116255 A1* | 4/2021 | Kim | ...................... | H04W 48/18 |
| 2021/0212022 A1* | 7/2021 | Tagyo | ................ | H04W 72/0446 |
| 2021/0227535 A1* | 7/2021 | Li | .......................... | H04W 28/26 |
| 2021/0297895 A1* | 9/2021 | Lee | ....................... | H04W 88/14 |
| 2021/0366295 A1* | 11/2021 | Hong | ................... | B64C 39/024 |

FOREIGN PATENT DOCUMENTS

| | | | |
|---|---|---|---|
| JP | 2011-061535 A | 3/2011 | |
| JP | 2016-052068 A | 4/2016 | |
| WO | WO-2013/031835 A1 | 3/2013 | |
| WO | WO-2018/021116 A1 | 2/2018 | |

OTHER PUBLICATIONS

Extended European Search Report issued in corresponding European Patent Application No. 18912903.4 dated Apr. 21, 2021.
Huang et al., "V2V Data Offloading for Cellular Network Based on the Software Defined Network (SDN) Inside Mobile Edge Computing (MEC) Architecture", IEEE Access, vol. 6, 2018, pp. 17741-17755.
Liu et al., "A Scalable and Quick-Response Software Defined Vehicular Network Assisted by Mobile Edge Computing", IEEE Communications Magazine, vol. 55, No. 7, July, pp. 94-100.
Zhang et al., "Mobile-Edge Computing for Vehicular Networks, A Promising Network Paradigm with Predictive Off-Loading", IEEE Vehicular Technology Magazine, vol. 12, No. 2, Jun. 2017, pp. 36-44.
Office Action issued in corresponding European Patent Application No. 18912903.4, dated May 4, 2023 (12 pages).

* cited by examiner

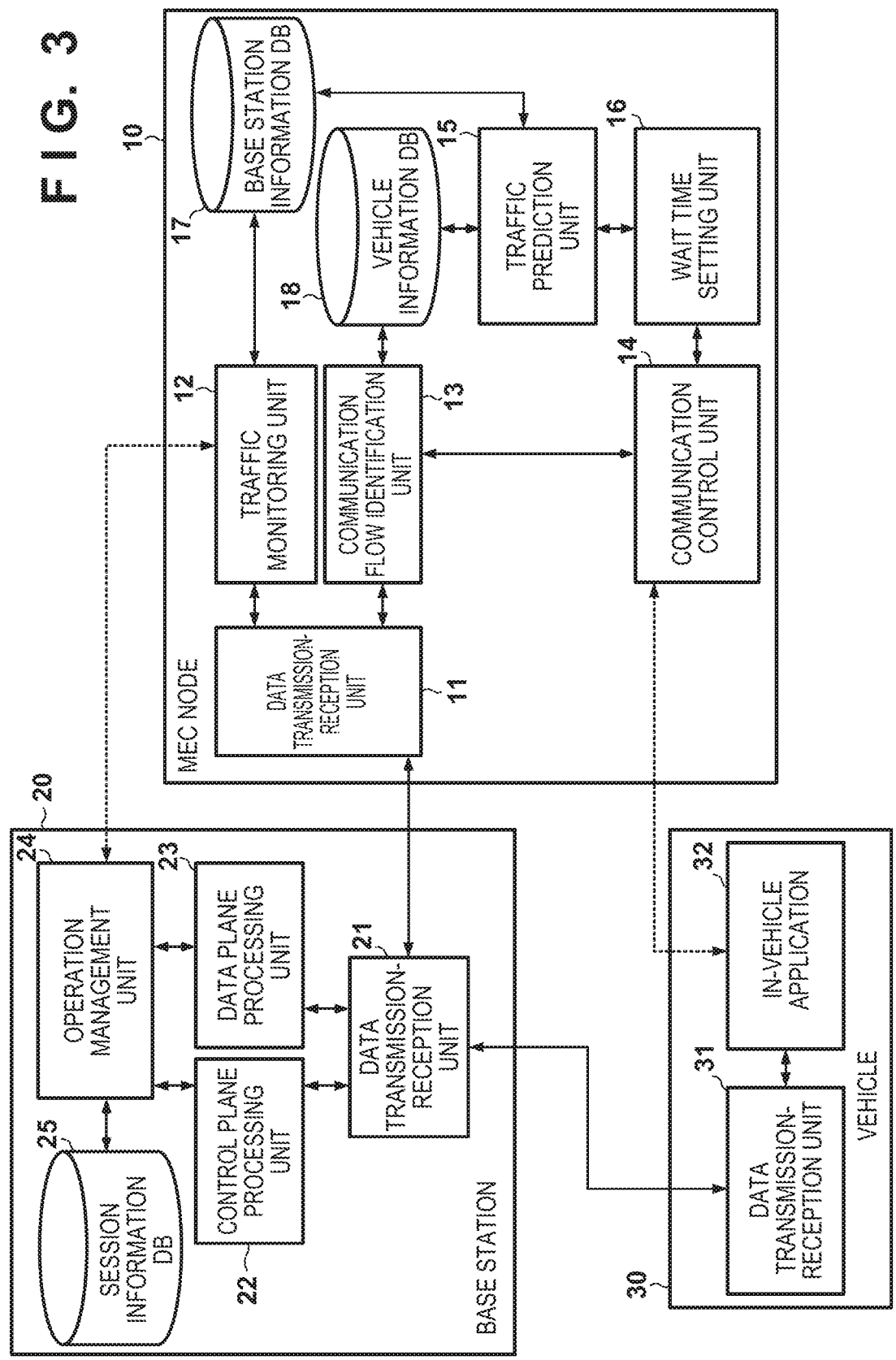

FIG. 4A

BASE STATION INFORMATION DB / 17

| CELL ID | TRAFFIC VOLUME HISTORY |
|---|---|
| 0x111101 | 412 Mbps (14:10:10)<br>400 Mbps (14:11:10)<br>435 Mbps (14:12:10)<br>... |
| 0x111102 | 389 Mbps (14:10:12)<br>350 Mbps (14:11:12)<br>411 Mbps (14:12:12)<br>... |
| 0x111201 | ... |
| ... | ... |

FIG. 4B

VEHICLE INFORMATION DB ~18

| VEHICLE ID | SERVING CELL ID | SERVICE TYPE | VOLUME OF DATA TO BE TRANSMITTED | VOLUME OF TRANSMITTED DATA | NEXT SCHEDULED COMMUNICATION TIME |
|---|---|---|---|---|---|
| 0x0123 | 0x111101 | 01 | 1 kB | — | now |
| 0x4567 | 0x111201 | 02 | 2 MB | 200 kB | 14:15:02 |
| 0x89ab | 0x111101 | 03 | 3 MB | — | 14:15:20 |
| ... | ... | ... | ... | ... | ... |

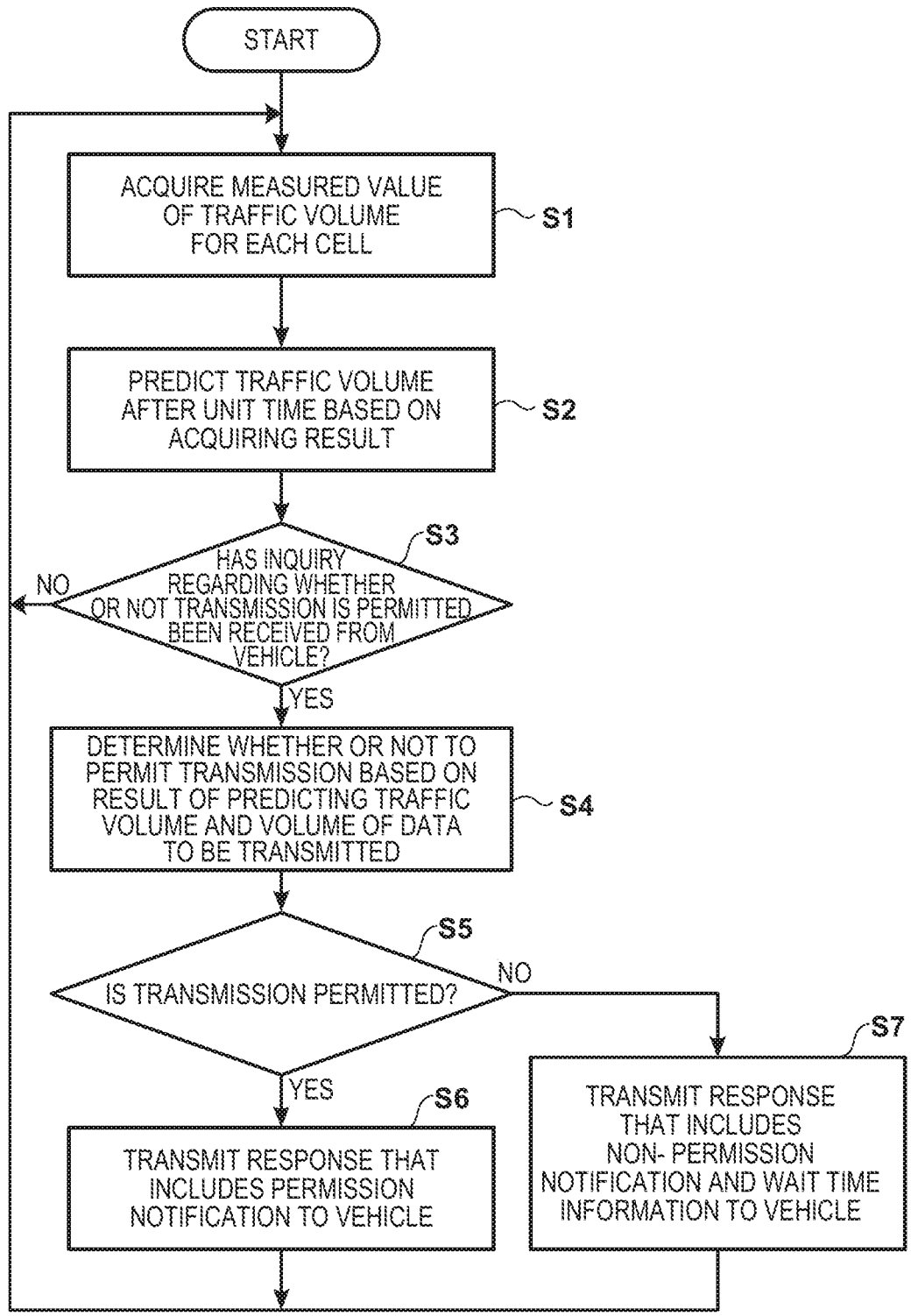

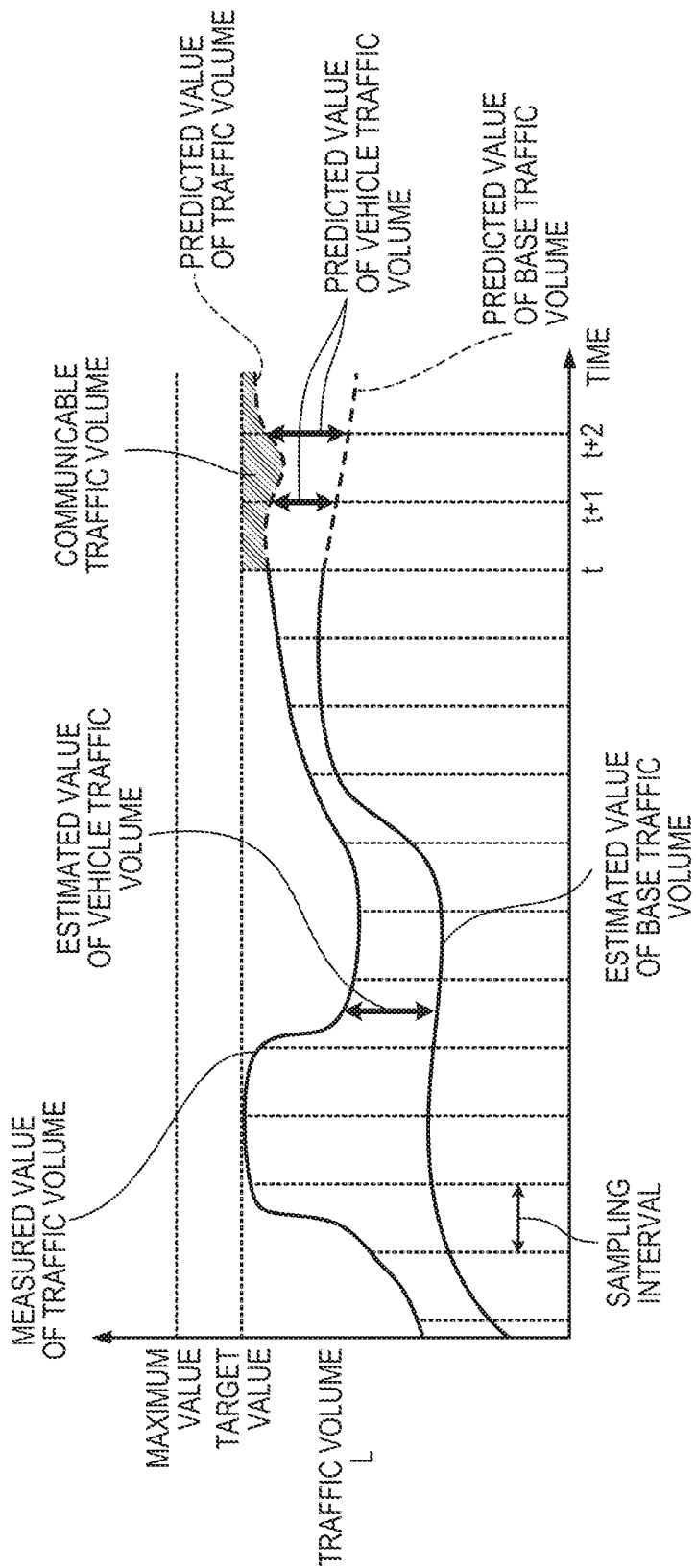

NODE APPARATUS, METHOD FOR CONTROLLING THE SAME, AND STORAGE MEDIUM

CROSS-REFERENCE TO RELATED APPLICATION(S)

This application is a continuation of International Patent Application No. PCT/JP2018/041137 filed on Nov. 6, 2018, which claims priority to and the benefit of Japanese Patent Application No. 2018-00543 filed on Mar. 30, 2018, the entire disclosures of which are incorporated herein by reference.

TECHNICAL FIELD

The present invention relates to a node apparatus, a method for controlling the same, and a storage medium for controlling uplink traffic from a vehicle that is connected to a mobile network.

BACKGROUND ART

Connected cars, which are automobiles that have communication functions and function as ICT terminals, are becoming more and more widespread. In order to improve the safety and comfort of automobiles, the connected cars transmit and receive information related to the automobiles, the drivers, or the surrounding conditions to and from a data center, thus allowing the data center to store and analyze the information. The connected cars transmit (upload) a wide variety of information (e.g. vehicle control and operation data, driver operation data, dynamic map data, moving image data from a dashboard camera, etc.) to a server installed in the data center via a network. The use of a cellular network is envisioned as a form of connection of such connected cars to the network.

With the spread of the connected cars, dynamic changes in terminal density or congestion with movement of the vehicles are expected as the number of in-vehicle terminals increases. For example, if a traffic jam of vehicles occurs and a particular cell is congested due to in-vehicle terminals, communication congestion occurs and the communication quality may deteriorate in that cell.

As a technology to address the aforementioned communication congestion, Patent Document 1 proposes a technology in which an overload and congestion of a server is detected on a server/infrastructure side, and a terminal is instructed to adjust the communication timing and wait. Further, congestion control with TCP is widely known as a type of congestion control. In the congestion control with TCP, an end terminal detects congestion in a network based on the response state of a communication counterpart, and adjusts its own communication traffic.

CITATION LIST

Patent Literature

PTL1: Japanese Patent Laid-Open No. 2010-191603

SUMMARY OF INVENTION

Technical Problem

In the above conventional technology, vehicle congestion is not considered in a communication network such as a cellular network, and the timing of transmission by vehicles is not controlled based on the vehicle congestion either. Moreover, although the occurrence of congestion is detected in a communication network, prediction of the occurrence of congestion is not performed. However, to prevent deterioration of the communication quality due to the occurrence of congestion, it is necessary to predict the occurrence of congestion based on the vehicle congestion, and control transmission by the vehicles in a communication network so as to prevent the occurrence of congestion.

The present invention has been made in view of the foregoing problem. The present invention aims to provide a technology for predicting the traffic volume in a cell formed by a base station and appropriately controlling uplink traffic from each vehicle in the cell, using edge computing.

Solution to Problem

According to one aspect of the present invention, there is provided a node apparatus that is connected to one or more base stations and controls data transmission by vehicles traveling in cells formed by the one or more base stations, the node apparatus comprising: an acquisition unit configured to acquire, from each of the one or more base stations, a measured traffic volume in a target cell, that is each of the cells formed by the one or more base stations; a prediction unit configured to predict a traffic volume after a unit time in the target cell, based on the measured traffic volume acquired by the acquisition unit; a determination unit configured to determine, upon an inquiry regarding whether or not data transmission is permitted being received from a vehicle in the target cell, whether or not to permit data transmission by the vehicle, based on a prediction result of the prediction unit predicting the traffic volume, and on a volume of data to be transmitted by the vehicle, the volume of data being indicated by information included in the inquiry; and a transmission unit configured to transmit, to the vehicle that has transmitted the inquiry, a response indicating whether or not to permit data transmission in accordance with the determination made by the determination unit.

According to another aspect of the present invention, there is provided a method for controlling a node apparatus that is connected to one or more base stations and controls data transmission by vehicles traveling in cells formed by the one or more base stations, the method comprising: acquiring, from each of the one or more base stations, a measured traffic volume in a target cell, that is each of the cells formed by the one or more base stations; predicting a traffic volume after a unit time in the target cell, based on the measured traffic volume acquired in the acquiring; determining, upon an inquiry regarding whether or not data transmission is permitted being received from a vehicle in the target cell, whether or not to permit data transmission by the vehicle, based on a prediction result of predicting the traffic volume, and on a volume of data to be transmitted by the vehicle, the volume of data being indicated by information included in the inquiry; and transmitting, to the vehicle that has transmitted the inquiry, a response indicating whether or not to permit data transmission in accordance with the determination.

According to still another one aspect of the present invention, there is provided a non-transitory computer-readable storage medium storing a program for causing a computer to perform a method for controlling a node apparatus that is connected to one or more base stations and controls data transmission by vehicles traveling in cells formed by the one or more base stations, the method comprising: acquiring, from each of the one or more base stations, a measured traffic volume in a target cell, that is each of the cells formed by the one or more base stations; predicting a traffic volume after a unit time in the target cell, based on the measured traffic volume acquired in the acquiring; determining, upon an inquiry regarding whether or not data transmission is permitted being received from a vehicle in the target cell, whether or not to permit data transmission by the vehicle, based on a prediction result of predicting the traffic volume, and on a volume of data to be transmitted by the vehicle, the volume of data being indicated by information included in the inquiry, and transmitting, to the vehicle that has transmitted the inquiry, a response indicating whether or not to permit data transmission in accordance with the determination.

Advantageous Effects of Invention

According to the present invention, to prevent communication congestion in a cell formed by a base station, uplink traffic from vehicles can be appropriately controlled using edge computing.

Other features and advantages of the present invention will be apparent in the following description with reference to the attached drawings. Note that, in the attached drawings, the same or similar constituents are assigned the same reference numerals.

BRIEF DESCRIPTION OF DRAWINGS

The attached drawings are included in the specification and constitute a part of the specification, illustrate embodiments of the present invention, and are used to describe the principle of the present invention together with the description of the specification.

FIG. 3 is a block diagram showing an example functional configuration of a base station, a vehicle, and the MEC node.

FIG. 4A is a diagram showing an example of information managed by the MEC node.

FIG. 4B is a diagram showing an example of information managed by the MEC node.

FIG. 5 is a flowchart showing a procedure of transmission control performed for a vehicle by the MEC node.

FIG. 6 is a diagram showing an example of a method of predicting traffic volume.

DESCRIPTION OF EMBODIMENTS

Hereinafter, exemplary embodiments of the present invention will be described with reference to the drawings. Note that, in the following diagrams, constituent elements that are not necessary for the description of the embodiments are omitted from the diagrams.

<Network Configuration>

Figure 1:
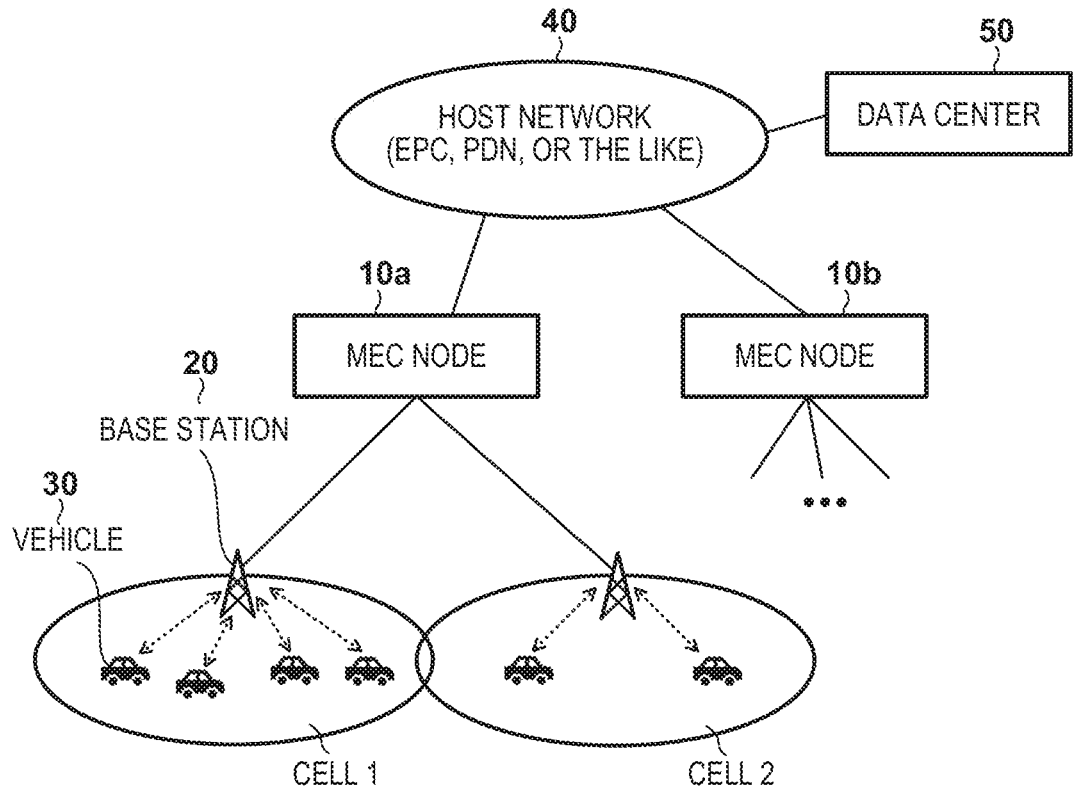
FIG. 1 is a diagram showing example configuration of communication network that includes MEC nodes.

FIG. 1 is a diagram showing an example configuration of a communication network that includes MEC nodes according to an embodiment of the present invention. MEC node 10 (each of MEC nodes 10a and 10b) of the present embodiment is a node apparatus for edge computing (MEC) that is connected to one or more base stations 20, and is connected between the one or more base stations 20 and a host network 40.

The MEC node 10 manages the one or more connected base stations 20, and manages one or more cells formed by the respective base stations 20. For example, the MEC node 10a manages cells 1 and 2. The MEC nodes 10 control data transmission by vehicles 30 that moves (travels) in the respective cells to be managed. Note that the MEC node 10 may provide the vehicles 30 with a service such as an automatic travel assistance service.

Vehicles (connected cars) that have a function of connecting to a communication network can wirelessly connect to a base station 20 that forms a cell, while traveling in the cell of the base station 20. The vehicles 30 that are wirelessly connected to the base station 20 can access the MEC node 10 and the host network 40 via the base station 20, and can also access a data center 50 via the host network 40. Thus, each of the vehicles 30 can transmit (upload) generated data (e.g. vehicle control and operation data, driver operation data, dynamic map data, moving image data from a dashboard camera, etc.) to the data center 50 via the connected base station 20.

Although only two MEC nodes 10a and 10b are present in the example configuration in FIG. 1, any number of MEC nodes can be arranged in the communication network. If an LTE (Long Term Evolution)/LTE-Advanced network is envisioned as the communication network, each of the base stations 20 is an eNodeB, and EPC (Evolved Packet Core), which is a core network, is included in the host network 40. Furthermore, an external network (e.g. a packet data network (PDN) or the Internet) that is an upper-level network than the core network may also be included in the host network 40.

Note that the communication network to which the present invention is applied may alternatively be a mobile network other than the LTE/LTE-Advanced network. For example, the communication network may alternatively be a fifth-generation (5G) mobile network that is being standardized through the 3rd Generation Partnership Project (3GPP).

<Summary of Processing Performed by MEC Node>

In the communication network such as a mobile network to which vehicles (connected cars) are connected, there is a possibility that communication congestion occurs depending on the vehicle congestion and the communication quality deteriorates, as mentioned above. In the present embodiment, to prevent the occurrence of such congestion, the MEC node 10 acquires data that indicates a traffic condition in the cells from the connected base stations, predicts the traffic volume in the cells based on the acquired data, and controls uplink traffic from vehicles in the cells.

Specifically, the MEC node 10 according to the present embodiment acquires, from each of the one or more connected base stations 20, a measured traffic volume in a target cell, that is each of the cells formed by the one or more base stations 20. The MEC node 10 predicts a traffic volume after a unit time in the target cell based on the acquired measured traffic volume. Furthermore, upon receiving, from a vehicle 30 in the target cell, an inquiry regarding whether or not data transmission is permitted, the MEC node 10 determines whether or not to permit the data transmission based on the result of predicting the traffic volume and the volume of data to be transmitted by the vehicle 30 the volume of data being indicated by information included in the inquiry. The MEC node 10 transmits, to the vehicle 30 that has transmitted the inquiry, a response indicating whether or not to permit the data transmission in accordance with the result of the determination.

An example configuration of the MEC node 10 and an example of a specific processing procedure for realizing such processing will be described below.

<Hardware Configuration of MEC Node>

Figure 2:
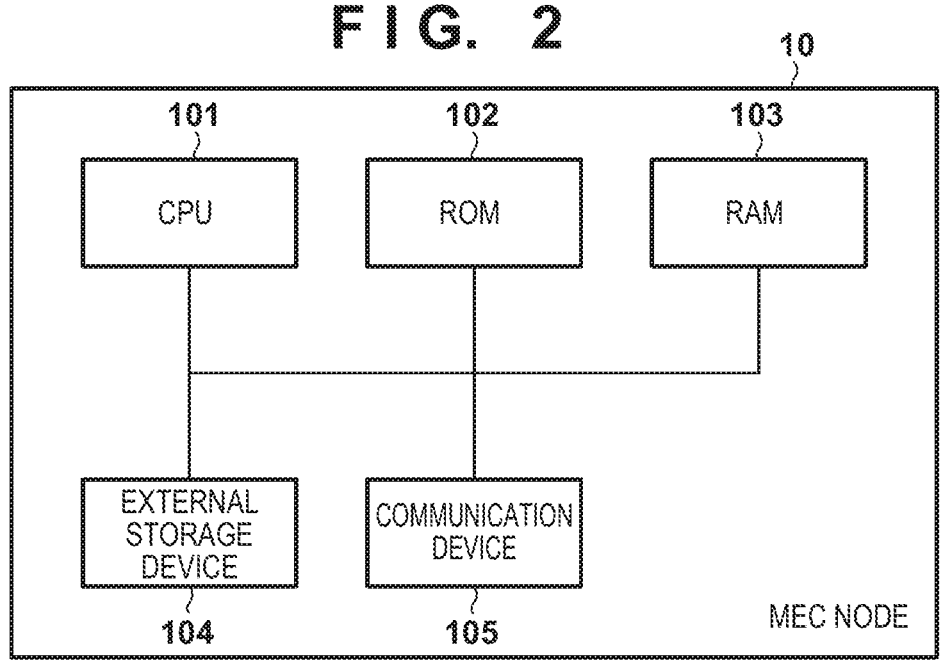
FIG. 2 is a block diagram showing an example hardware configuration of an MEC node.

FIG. 2 is a block diagram showing an example hardware configuration of the MEC node 10 according to the present embodiment. The MEC node 10 includes a CPU 101, a ROM 102, a RAM 103, an external storage device 104 (such as an HDD), and a communication device 105 (communication interface).

In the MEC node 10, for example, a program for realizing the functions of the MEC node 10, that is stored in any of the ROM 102, the RAM 103, and the external storage device 104 is executed by the CPU 101. Note that the CPU 101 may be replaced by one or more processors that are constituted by an ASIC (Application Specific Integrated Circuit), an FPGA (Field Programmable Gate Array), a DSP (Digital Signal Processor), or the like.

The communication device 105 communicates with the base stations 20 that are connected to the MEC node 10 (i.e. communicates with vehicles via the base stations 20), and also communicates with nodes (e.g. the data center 50) that are connected to the host network 40, under the control of the CPU 101. The MEC node 10 may have a plurality of communication devices 105 that are connected to different destinations.

<Functional Configuration of MEC node, Base Station, and Vehicle>

FIG. 3 is a block diagram showing an example functional configuration of the MEC node 10, the base station 20, and the vehicle 30. The functions of the MEC node 10 are logical functions that are realized by the hardware in FIG. 2, for example, and may be realized by the CPU 101 executing a program stored in the ROM 102 or the like. Note that the MEC node 10 may include dedicated hardware are for performing the functions, or may perform some of the functions by means of hardware and perform the other functions using a computer that operates a program. All of the functions may be performed by a computer and a program.

In the present embodiment, the MEC node 10 has a data transmission-reception unit 11, a traffic monitoring unit 12, a communication flow identification unit 13, a communication control unit 14, a traffic prediction unit 15, a wait time setting unit 16, a base station information DB (database) 17, and a vehicle information DB 18. The base station 20 has a data transmission-reception unit 21, a control plane processing unit 22, a data plane processing unit 23, an operation management unit 24, and a session information DB 25. The vehicle 30 has a data transmission-reception unit 31 and an in-vehicle application 32.

(Base Station 20)

In the base station 20, the data transmission-reception unit 21 communicates with one or more wireless terminals in a cell formed by the base station 20, and also communicates with the MEC node 10 or an upper-level node. In the cell of the base station 20, there may be not only in-vehicle terminals corresponding to the vehicles 30, but also wireless terminals other than the vehicles.

The control plane processing unit 22 transmits and receives signals (control signals) of a control plane via the data transmission-reception unit 21 to and from the wireless terminals in the cell, the MEC node 10, or the upper-level node. The data plane processing unit 23 transmits and receives signals of a data plane via the data transmission-reception unit 21 to and from the wireless terminals in the cell, the MEC node 10, or the upper-level node.

The operation management unit 24 manages communication sessions used in communication performed by the control plane process unit 22 and the data plane processing unit 23, and ascertains the communication status of the base station 20. The operation management unit 24 stores information related to a communication session to be managed in the session information DB 25. The operation management unit 24 measures, as the communication status, the traffic volume (throughout) in the cell. The operation management unit 24 may also have a function of measuring, as the traffic volume, the total traffic volume in communication sessions performed by wireless terminals other than the vehicles in the cell. The operation management unit 24 transmits, to the MEC node 10, a response that includes information indicating the communication status in the cell of the base station in accordance with an inquiry from the traffic monitoring unit 12 of the MEC node 10. The information indicating the communication status in the cell is, for example, a measured traffic volume obtained by measurement. The measured traffic volume may be a measured value of the total traffic volume in communication sessions performed by vehicles and the wireless terminal other than the vehicles, or may be a measured value of the total traffic volume in communication sessions performed by the wireless terminals other than the vehicles.

(Vehicle 30)

The data transmission-reception unit 21 wirelessly connects to the base station 20 corresponding to the serving cell, and communicates, via the base station 20, with the MEC node 10 or the data center 50 connected to the host network 40. The in-vehicle application 32 controls application processing associated, with various services for vehicles and controls transmission and reception of data associated with this application processing (such as CAN (Controlled Area Network) or point group data). The in-vehicle application 32 communicates, via the data transmission-reception unit 21, with the MEC node 10 connected to the base station 20, or a node such as the data center 50 connected to the host network 40.

In the present embodiment, the in-vehicle application 32 transmits data to the base station 20 (i.e. transmits data to a node such as the data center 50 via the base station 20) in accordance with transmission control performed by the MEC node 10. When starting data transmission, the in-vehicle application 32 makes an inquiry regarding whether or not data transmission is permitted, to the MEC node 10. If transmission is permitted by the MEC node 10, data transmission is started. On the other hand, if data transmission is not permitted, the in-vehicle application 32 again makes an inquiry regarding whether or not data transmission is permitted, to the MEC node 10 after a wait time, which is set by the MEC node 10, has elapsed.

(MEC Node 10)

The data transmission-reception unit 11 communicates with the base station 20, and communicates via the base station 20 with in-vehicle terminals (vehicles 30) in the cell of this base station. The communication flow identification unit 13 identifies a flow of a packet received by the data transmission-reception unit 11, outputs a control packet associated with the communication with the vehicles 30 to the communication control unit 14, and stores information obtained from this control packet a the vehicle information DB 18. For example, upon receiving a control packet that includes an inquiry regarding whether or not data transmission is permitted, the communication flow identification unit 13 outputs this control packet to the communication control unit 14.

The traffic monitoring unit 12 monitors the communication status (traffic) of the base station 20 by communicating with the operation management unit 24 of the base station 20 via the data transmission-reception unit 11. The traffic monitoring unit 12 acquires, from the operation management unit 24 of the base station 20, information (such as a measured traffic volume) indicating the communication status in the cell of the base station 20, using a function of, for example, an RNI (Radio Network Information) service, which is provided in the standard specifications of MEC. The traffic monitoring unit 12 stores the information acquired from the base station 20 in the base station information DB 17.

Upon receiving an inquiry regarding whether or not data transmission is permitted, from a vehicle 30 in the cell of the base station 20, the communication control unit 14 determines whether or not to permit data transmission by this vehicle, and performs transmission control to control data transmission by the vehicle. As will be described later, this transmission control is performed based on the result of the traffic prediction unit 15 predicting future traffic, information stored in the vehicle information DB 18, and, as necessary, a wait time set by the wait time setting unit 16. If determining to permit data transmission, the communication control unit 14 transmits, to the vehicle that has transmitted the inquiry, a response that includes a permission notification to permit transmission, such that the vehicle 30 starts data transmission.

The traffic monitoring unit 15 predicts traffic after a unit time in the cell of the base station 20, based on information acquired by the traffic monitoring unit 12 and stored in the base station information DB 17, and information stored in the vehicle information DB 18. If it is determined by the communication control unit 14 that the vehicle 30 is not permitted to transmit data, the wait time setting unit 16 sets a wait time until this vehicle makes the next inquiry to the MEC node 10. As will be described later, setting of the wait time is performed based on the result of the traffic prediction unit 15 predicting the future traffic (after the unit time), and information stored in the vehicle information DB.

<Information Managed by MEC Node 10>

FIGS. 4A and 4B show examples of information managed by the MEC node 10. FIG. 4A shows an example of information stored in the base station information DB 17, and FIG. 4B shows an example of information stored in the vehicle information DB 18. Note that the information included in the base station information DB 17 and the vehicle information DB 18 are manned in a state in which it stored in the external storage device 104.

As shown in FIG. 4A, in the base station information DB 17, a cell ID of each of the cells formed by one or more base stations 20 connected to the MEC node 10, and history of the traffic volume (information indicating the communication status) in the cell corresponding to the cell ID are registered. Every time the traffic monitoring unit 12 acquires information from the operation management unit 24 of the base station 20, the acquired information may be registered in association with time information in the base station information DB 17.

Note that the information stored in the base station information DB 17 is not limited to the information shown in FIG. 4A. For example, an average in-cell time during which the vehicle 30 is in each cell may be added. In this case, the traffic monitoring unit 12 monitors the average in-cell time of the vehicle in each of the cells formed by the base stations 20 connected to the MEC node 10, based on the information acquired from the base station 20 (operation management unit 24), and registers the average in-cell time in the base station information DB 17.

As shown in FIG. 4B, in the vehicle information DB 18, information included in an inquiry regarding whether or not data transmission is registered when this inquiry is received from the vehicle 30 in the cell of the base station 20. The inquiry from the vehicle 30 at least includes information that indicates a vehicle ID, a service type, a volume of data to be transmitted, and a volume of transmitted data, and this information is registered in the vehicle information DB 18.

The service type refers to a service type associated with the data transmitted by the vehicle 30, and indicates, for example, whether the data to be transmitted by the vehicle 30 is CAN data, point group data, or other data. Thus, the service type may indicate the degree of urgency or the real-time property of transmission data.

The volume of data to be transmitted refers to the total volume of transmission data that the vehicle 30 has. The volume of transmitted data refers to the volume of data that has already been transmitted by the vehicle thus far, out of the volume of data to be transmitted. For example, in a case where data transmission is interrupted due to the vehicle 30 performing handover between cells, a value that is not 0 may be set as the volume of transmitted data.

In the vehicle information DB 18, a cell ID (serving cell ID) of a cell by which the vehicle 30 is served is further registered. Note that, when an inquiry from the vehicle 30 is received, the cell ID included in the received packet is registered as the serving cell ID. Also, in the vehicle information DB 18, the next scheduled communication time of the vehicle 30 corresponding to the vehicle ID is further registered. The next scheduled communication time is set as the result of the communication control unit 14 determining whether or not to permit data transmission by the vehicle 30. If transmission is permitted, "now" is registered, and if transmission is not permitted, the time corresponding to the wait time set by the wait time setting unit 16 is registered.

Note that the information stored in the vehicle information DB 18 is not limited to the information shown in FIG. 4A. For example, history of the serving cell IDs may also be added. Thus, the history of movement between the cells formed by one or more base stations 20 may be held as the history of the serving cell IDs for each vehicle in the vehicle information DB 18.

<Procedure of Transmission Control>

Next a description be given, with reference to FIGS. 5 and 6, of a specific procedure of transmission control for controlling data transmission from the vehicle 30, performed by the MEC node 10. FIG. 5 is a flowchart showing the procedure of the transmission control performed by the MEC node 10. FIG. 6 is a diagram showing an example of a method of predicting a traffic volume performed by the traffic prediction unit 15.

First, in step S1, the traffic monitoring unit 12 acquires, from the base station 20, a measured value of the traffic volume (measured traffic volume) in a target cell, which is each of the cells that are to be managed by the MEC node 10. Note that the traffic volume indicates throughout, for example. The measured traffic volume is acquired by the traffic monitoring, unit 12 at time intervals (e.g. once in several minutes) that enable prediction of the traffic volume in step S2. The measured traffic volume is registered as traffic volume history in the base station information DB 17.

Next, in step S2 the traffic prediction unit 15 predicts the traffic volume after the unit time based on the result of acquiring the measured value of the traffic volume. In the present embodiment, acquisition of the measured traffic volume and prediction of the traffic volume are performed at predetermined sampling intervals, as shown in FIG. 6. Given that the current time is t, the traffic prediction unit 15 predicts the traffic volume at future times (time t+1, t+2, . . . ) based on the measured traffic volumes acquired before the time t. A specific method of predicting a traffic volume will be described later with reference to FIG. 6.

Thereafter, in step S3, the communication control unit 14, determines whether or not an inquiry regarding whether or not data transmission is permitted has been received via the base station 20 from any of the vehicles 30 in the target cell.

Here, in the case of transmitting data (e.g. CAN data or point group data) associated with the in-vehicle application 32 to, as a destination, the data center 50, the MEC node 10, or the like, first, the vehicle 30 makes an inquiry regarding whether or not transmission is permitted, to the MEC node 10 that manages the serving cell. Then, if the vehicle 30 receives from the MEC node 10 a response including a permission notification indicating that transmission is permitted, the vehicle 30 starts data transmission. On the other hand, if the vehicle 30 receives from the MEC node 10 a response including a non-permission notification indicating that transmission is not permitted, the vehicle 30 again makes an inquiry regarding whether or not transmission is permitted, after a wait time designated in this response has elapsed.

If no inquiry has been received from a vehicle 30 in the target cell 30, the communication control unit 14 returns the processing from step S3 to step S1, and if an inquiry has been received, the communication control unit 14 advances the processing from step S3 to step S4.

In step S4, the communication control unit 14 determines whether or not to permit data transmission by the vehicle 30 that has transmitted the inquiry, based on the result of predicting the traffic volume (predicted value of the traffic volume after the unit time) in step S2 and the volume of data to be transmitted that is included in the received inquiry.

Specifically, the communication control unit 14 permit transmission if the traffic volume for transmitting data to be transmitted does not exceed a communicable traffic volume that corresponds to a difference between the predicted value of the traffic volume and a target value of a traffic volume L shown in FIG. 6. At this time, the communication control unit 14 may permit transmission if the traffic volume for transmitting a remaining data volume after excluding the volume of transmitted data from the volume of data to be transmitted does not exceed the communicable traffic volume.

Also, in such a case where inquiries axe received from a plurality of vehicles, the communication control unit 14 may determine whether or not to permit data transmission for each of the vehicles, based on the priority corresponding to the service type indicated by information included in the inquiries. For example, the higher the degree of urgency or the real-time property indicated by the service type is, the higher the priority given to permitting data transmission is. Communication with a lower degree of urgency or real-time property is allowed to be performed while avoiding a congested area (cell), and communication with a higher degree of urgency or real-time property is allowed to be preferentially started so that its communication stability can be increased.

Also, in such a case where inquiries are received from a plurality of vehicles, the communication control unit 14 may make a determination to permit data transmission while giving priority to vehicles that have transmitted inquiries that include information indicating that the volume of transmitted data is not 0. The communication control unit 14 may also make a determination to permit data transmission while giving priority to vehicles whose remaining data volume after excluding the volume of transmitted data from the volume of data to be transmitted is smaller. Thus, communication by a vehicle that has already started data transmission can be completed earlier.

Next, in step S5, the communication control unit 14 advances the processing to step S6 if transmission is permitted for the received inquiry, and advances the processing to step S7 if transmission is not permitted, in accordance with the determination made in step S4.

In step S6, the communication control unit 14 transmits a response that includes a permission notification indicating that transmission is permitted, to the vehicle 30 that has transmitted the inquiry, and returns the processing to step S1. The vehicle 30 in the target cell that has received the response that includes the permission notification starts data transmission to the base station 20.

On the other hand, in step S7, the communication control unit 14 transmits a response that includes a non-permission notification indicating that transmission is not permitted, to the vehicle 30 that has transmitted the inquiry, and returns the processing to step S1. At this time, the communication control unit 14 includes a wait time set by the wait time setting unit 16 in the response to notify the vehicle 30 of the wait time. The wait time setting unit 16 calculates the remaining data volume after excluding the volume of transmitted data from the volume of data to be transmitted, based on the result of predicting the traffic volume and the information included in the received inquiry, and sets the wait time such that the vehicle 30 makes the next inquiry in accordance with the timing at which data of the remaining data volume can be transmitted. Thus, the communication control unit 14 controls the timing at which the vehicle 30 transmits the next inquiry to the MEC node 10 by designating the wait time for the vehicle 30.

<Traffic Prediction>

Next, a description will be given of a specific example of the method of predicting a traffic volume performed by the traffic prediction unit 15, again referring to FIG. 6. The traffic volume is predicted through the following processing (1) to (4).

(1) Estimation of Base Traffic Volume

First, the traffic prediction unit 15 acquires an estimated value of a base traffic volume, as shown in FIG. 6, by estimating the base traffic volume at the current time t. The base traffic volume corresponds to the total traffic volume in communication sessions performed by wireless terminals other than vehicles, out of the measured traffic volume in the target cell. The base traffic volume is used in traffic prediction (i.e. the traffic volume in communication sessions performed by vehicles is excluded) because the traffic volume in the communication sessions performed by the vehicles may dynamically vary due to high moving speed of the vehicles, and is not appropriate for prediction of the traffic volume using an exponential smoothing method or the like.

The estimated value of the base traffic volume can be obtained by, for example, subtracting an estimated value of the total traffic volume in communication sessions performed by the vehicles 30 in the target cell, from the measured traffic volume. The estimated value of the total traffic volume of the vehicles can be estimated, to some extent, based on the inquiries regarding whether or not data transmission is permitted, that have been made by the vehicles 30 in the target cell. The timing at which each of the vehicles 30 transmits data and the traffic volume (transmission data volume) at this timing can be determined, to some extent, based on the inquiries made by the vehicles 30 and these values can be used in the estimation of the total traffic volume.

Alternatively, in a case where the total traffic volume in communication sessions performed by wireless terminals other than the vehicles in the target cell can be acquired as a measured traffic volume from the base station 20, the acquired measured traffic volume may be used as the estimated value of the base traffic volume.

Note that, in FIG. 6, the difference between the measured value of the traffic volume (measured traffic volume) and the estimated value of the base traffic volume corresponds to the estimated value of the total traffic volume (vehicle traffic volume) in communication sessions performed by the vehicles in the target cell.

(2) Prediction of Base Traffic Volume after Unit Time

Next, the traffic prediction unit 15 obtains a predicted value (first predicted value) of the base traffic volume after the unit time (time t+1, t+2, . . . ) using a prediction algorithm such as an exponential smoothing method or the like, based on the acquired estimated values of the base traffic volume.

(3) Prediction of Vehicle Traffic Volume after Unit Time

Next, the traffic prediction unit 15 obtains a predicted value (second predicted value) of the vehicle traffic volume after the unit time, based on the inquiries regarding whether or not data transmission is permitted, that have been made by the vehicles 30 in the target cell. Specifically, the traffic prediction unit 15 determines a vehicle that will possibly transmit data after the unit time (time t+1, t+2, . . . ), based on the inquiries made by the vehicles 30, and uses, in the prediction of the vehicle traffic volume, the volume of data to be transmitted when the determined vehicle transmits data.

The accuracy of the vehicle traffic volume prediction can be increased by using an average in-cell time of the vehicles 30 in the target cell, for example. Specifically, the traffic prediction unit 15 determines whether or not there is a possibility that a specific vehicle in the target cell will transmit data in the target cell after the unit time, based on the average in-cell tune in the target cell and the wait time that is set in accordance with the inquiry made by this specific vehicle. Furthermore, in a case where there is a possibility that data will be transmitted in the target cell, the traffic prediction unit 15 uses the data traffic volume that is scheduled for the specific vehicle to obtain the predicted value (second predicted value) of the vehicle traffic volume. Thus, if there is a possibility that a vehicle that has made an inquiry to the MEC node 10 will again make an inquiry in the same cell and transmit data, the volume of data that will be transmitted by the vehicle is used in the prediction of the vehicle traffic volume. As a result, the prediction accuracy can be increased.

The accuracy of the vehicle traffic volume prediction can also be increased by using movement history of the vehicles 30, for example. Specifically, the traffic prediction unit 15 determines a vehicle that will possibly perform handover to the target cell and transmit data after the unit time, based on the movement history of each vehicle held in the vehicle information DB 18 and the inquiry made by each vehicle. Furthermore, the traffic prediction unit 15 uses the data traffic volume scheduled for the determined vehicle to obtain the predicted value (second predicted value) of the vehicle traffic volume. Thus, the prediction accuracy can be increased by predicting the vehicle traffic volume while giving consideration to the influence of handover by the vehicle.

(4) Acquisition of Predicted Value of Traffic Volume

As shown in FIG. 6, the predicted value of the traffic volume can be obtained by adding the predicted value (second predicted value) of the vehicle traffic volume to the predicted value (first predicted value) of the base traffic volume. For this reason, the traffic prediction unit 15 outputs the sum of the first predicted value and the second predicted value as the predicted value of the traffic volume after the unit time (time t+1, t+2, . . . ) in the target cell.

As described above, in the present embodiment, the MEC node 10 acquires the measured traffic volume in each of the cells (target cell) formed by one or more connected base stations 20, from each of the base stations 20. The MEC node 10 predicts the traffic volume after the unit time in the target cell, based on the acquired measured traffic volumes. Furthermore, upon receiving, from a vehicle 30 in a target cell, an inquiry regarding whether or not data transmission is permitted, the MEC node 10 determines Whether or not to permit the data transmission based on the result of predicting the traffic volume and the volume of data to be transmitted by this vehicle 30, that is indicated by information included in the inquiry. The MEC node 10 transmits a response indicating whether or not to permit the data transmission, to the vehicle 30 that has transmitted the inquiry, in accordance with the determination result.

Thus, the MEC node 10 can appropriately control the timing at which each vehicle 30 in the cells of the connected base stations 20 transmits data, in accordance with the traffic volume predicted in the cells so as to avoid the occurrence of congestion. In addition, each vehicle 30 in the cells can be aware of an appropriate communication timing, and becomes possible to transmit data at an appropriate timing in accordance with the transmission control performed by the MEC node 10. Accordingly, it becomes possible to suppress communication in a congested cell (area), prevent the occurrence of congestion, and avoid deterioration of the communication quality due to the occurrence of congestion Note that the above embodiment has described the case where the MEC node 10 performs, for each of the cells, transmission control for the vehicles 30. However, if sectors are formed by the base station 20, similar transmission control can also be applied to each of the sectors.

A node apparatus according to the present embodiment can be realized by a computer program for causing a computer to function as the node apparatus. The computer program can be stored in a computer-readable storage medium and distributed, or can be distributed via a network.

The present invention is not limited to the above embodiments and various changes and modifications can be made within the spirit and scope of the present invention. Therefore, to apprise the public of the scope of the present invention, the following claims are made.

What is claimed is:

1. A node apparatus that is connected to one or more base stations and controls uplink data transmission by vehicles traveling in cells formed by the one or more base stations, the node apparatus comprising:
   at least one processor circuit with a memory comprising instructions, that when executed by the processor circuit, cause the at least one processor circuit to perform:
   acquiring, from each of the one or more base stations, a measured traffic volume in a target cell, that is each of the cells formed by the one or more base stations;

predicting a traffic volume after a unit time in the target cell, based on the measured traffic volume acquired in the acquiring;

a determining, upon an inquiry regarding whether or not uplink data transmission is permitted being received from a vehicle in the target cell, whether or not to permit uplink data transmission by the vehicle, based on a prediction result of predicting the traffic volume, and on a volume of data to be transmitted by the vehicle, wherein the volume of data to be transmitted by the vehicle is indicated by information included in the inquiry that has been received from the vehicle; and transmitting, to the vehicle that has transmitted the inquiry, a response indicating whether or not to permit uplink data transmission in accordance with the determination.

2. The node apparatus according to claim 1,
wherein when executed by the processor circuit, the instructions further cause the at least one processor circuit to perform setting a wait time until the vehicle makes a next inquiry to the node apparatus, based on the prediction result and the volume of data to be transmitted, in a case where it is determined that uplink data transmission is not permitted,
wherein the set wait time is included in the response indicating that uplink data transmission is not permitted, to notify the vehicle of the wait time.

3. The node apparatus according to claim 2, wherein
the inquiry further includes information indicating a volume of transmitted data that has already been transmitted by the vehicle thus far, out of the volume of data to be transmitted, and
the setting includes calculating a remaining data volume after excluding the volume of transmitted data from the volume of data to be transmitted, and setting the wait time such that the vehicle makes the next inquiry in accordance with a timing at which data of the remaining data volume can be transmitted.

4. The node apparatus according to claim 2, wherein
the predicting includes
obtaining a base traffic volume, that is a total traffic volume in communication sessions performed by terminals other than vehicles, out of the measured traffic volume,
obtaining a first predicted value of the base traffic volume after the unit time,
obtaining a second predicted value of a total traffic volume in communication sessions performed by vehicles after the unit time, based on the inquiry made by each vehicle in the target cell, and
outputting a sum of the first predicted value and the second predicted value as a predicted value of a traffic volume after the unit time in the target cell.

5. The node apparatus according to claim 4, wherein
the base traffic volume is obtained by subtracting, from the measured traffic volume, an estimated value of the total traffic volume in the communication sessions performed by vehicles, the estimated value being obtained based on the inquiry made by each vehicle in the target cell.

6. The node apparatus according to claim 4, wherein
in the acquiring, a total traffic volume in communication sessions performed by terminals other than vehicles in the target cell is acquired as the measured traffic volume.

7. The node apparatus according to claim 4,
wherein when executed by the processor circuit, the instructions further cause the at least one processor circuit to monitor an average in-cell time of vehicles in each of the cells formed by the one or more base stations,
wherein the predicting includes determining whether or not there is a possibility that a specific vehicle in the target cell transmits data in the target cell after the unit time, based on the average in-cell time in the target cell and the wait time that is set in accordance with the inquiry made by the specific vehicle, and, in a case where there is a possibility that the specific vehicle transmits data in the target cell, using a data traffic volume scheduled for the specific vehicle to obtain the second predicted value.

8. The node apparatus according to claim 4,
wherein when executed by the processor circuit, the instructions further cause the at least one processor circuit to hold, for each vehicle, history of movement between the cells formed by the one or more base stations,
wherein the predicting includes determining a vehicle that possibly performs handover to the target cell and transmits data after the unit time, based on the held history of movement of each vehicle, and on the inquiry made by each vehicle, and using a data traffic volume scheduled for the determined vehicle to obtain the second predicted value.

9. The node apparatus according claim 1, wherein
the inquiry further includes information indicating a volume of transmitted data that has already been transmitted by the vehicle, out of the volume or data to be transmitted, and
in the determining, it is determined to permit uplink data transmission while giving priority to a vehicle that has transmitted the inquiry including information indicating that the volume of transmitted data is not 0.

10. The node apparatus according to claim 9, wherein
in the determining, it is determined to permit uplink data transmission while giving priority to a vehicle whose remaining data volume after excluding the volume of transmitted data from the volume of data to be transmitted is smaller.

11. The node apparatus according to claim 1, wherein
the inquiry further includes information indicating a service type associated with data to be transmitted by the vehicle, and
in the determining, whether or not to permit uplink data transmission is determined based on a priority corresponding to the service type indicated by the information included in the inquiry.

12. The node apparatus according to claim 11, wherein
the service type indicates a degree of urgency or a real-time property of transmission data.

13. The node apparatus according to claim 1, wherein
in the acquiring the measured traffic volume in the target cell is acquired at predetermined time intervals from each of the base stations.

14. A method for controlling a node apparatus that is connected to one or more base stations and controls uplink data transmission by vehicles traveling in cells formed by the one or more base stations, the method comprising:
acquiring, from each of the one or more base stations, a measured traffic volume in a target cell, that is each of the cells formed by the one or more base stations;

predicting a traffic volume after a unit time in the target cell, based on the measured traffic volume acquired in the acquiring;

determining, upon an inquiry regarding whether or not uplink data transmission is permitted being received from a vehicle in the target cell, whether or not to permit uplink data transmission by the vehicle, based on a prediction result of predicting the traffic volume, and on a volume of data to be transmitted by the vehicle, wherein the volume of data to be transmitted by the vehicle is indicated by information included in the inquiry that has been received from the vehicle; and transmitting, to the vehicle that has transmitted the inquiry, a response indicating whether or not to permit uplink data transmission in accordance with the determination.

15. A non-transitory computer-readable storage medium storing a program for causing a computer to perform a method for controlling a node apparatus that is connected to one or more base stations and controls uplink data transmission by vehicles traveling in cells formed by the one or more base stations, the method comprising:

acquiring, from each of the one or more base stations, a measured traffic volume in a target cell, that is each of the cells formed by the one or more base stations;

predicting a traffic volume after a unit time in the target cell, based on the measured traffic volume acquired in the acquiring;

determining, upon an inquiry regarding whether or not uplink data transmission is permitted being received from a vehicle in the target cell, whether or not to permit uplink data transmission by the vehicle, based on a prediction result of predicting the traffic volume, and on a volume of data to be transmitted by the vehicle, wherein the volume of data to be transmitted by the vehicle is indicated by information included in the inquiry that has been received from the vehicle; and transmitting, to the vehicle that has transmitted the inquiry, a response indicating whether or not to permit uplink data transmission in accordance with the determination.

* * * * *